(12) United States Patent
Ando et al.

(10) Patent No.: US 6,727,823 B2
(45) Date of Patent: Apr. 27, 2004

(54) PASSENGER DETECTION SYSTEM (75) Inventors: Junichi Ando, Zama (JP); Yukiteru Yamamoto, Hiratsuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/120,516

(22) Filed: Apr. 12, 2002

(65) Prior Publication Data

US 2002/0171540 A1 Nov. 21, 2002

(30) Foreign Application Priority Data

May 16, 2001 (JP) .................................. 2001-145721

(51) Int. Cl.$^7$ .......................... G08B 21/00; B60Q 7/00; B60R 21/32; B60D 7/28
(52) U.S. Cl. ........................ 340/666; 340/438; 340/457; 340/522; 340/686.1; 180/273; 180/290; 180/271; 280/735
(58) Field of Search .............................. 340/666, 665, 340/667, 686.1, 438, 522, 457; 180/273, 290, 271; 280/735; 200/85 R, 85 A (56) References Cited

U.S. PATENT DOCUMENTS 6,206,452 B1 * 3/2001 Talbot ..................... 296/146.1
6,366,200 B1 * 4/2002 Aoki .......................... 340/438
6,476,516 B1 * 11/2002 Reich ....................... 307/10.1

FOREIGN PATENT DOCUMENTS

JP            9301120 A       11/1997

* cited by examiner

Primary Examiner—Jeffery Hofsass
Assistant Examiner—Lam Pham
(74) Attorney, Agent, or Firm—Shinjyu Global IP Counselors, LLP.

(57) ABSTRACT

A passenger detection system is provided to determine if a passenger is present or not because the weight value corresponding to when the seat is empty has shifted. The passenger detection system detects when the door has changed from the closed state to the open state based on a signal from a door switch. The passenger detection system then senses the decrease in weight that occurs thereafter and stores the weight value obtained after the decrease as the empty seat value.

11 Claims, 5 Drawing Sheets

To Passenger Detection Unit 1

PASSENGER DETECTION SYSTEM

BACKGROUND OF THE INVENTION

1. Field of the Invention

The present invention relates to a passenger detection system that detects whether or not a passenger is sitting on a seat of a vehicle. More specifically, the present invention relates to a method of revising an empty seat reference weight that is used as a standard for determining if there is a passenger on a seat.

2. Background Information

An example of a conventional passenger detection system is described in Japanese Laid-Open Patent Publication No. 9-301120. This passenger detection system is fixed onto a body of a vehicle and has a strain gauge arranged on a rigid portion that holds a seat. When a passenger sits on the seat, the strain gauge detects the deflection of the rigid portion, and thus, detects that a passenger has sat down.

In view of the above, there exists a need for an improved passenger detection system. This invention addresses this need in the art as well as other needs, which will become apparent to those skilled in the art from this disclosure.

SUMMARY OF THE INVENTION

It has been discovered that the above described passenger detection system determines that a passenger is sitting on the seat when the value outputted from the strain gauge indicates a strain larger than the strain value outputted when no one is sitting on the seat. If, for example, the vehicle body is deformed due to a light collision, the value outputted by the strain gauge when there is no passenger sitting on the seat may be different than it was before the collision. Consequently, since the determination is based on the output value, there is the possibility that the passenger detection system will not be able to accurately determine if a passenger is sitting on the seat or not.

The object of the present invention is to resolve this issue by providing a passenger detection system that can appropriately revise the value outputted from the strain gauge when there is no passenger sitting on the seat to determine with certainty if a passenger is sitting on the seat even after the output value has changed due to the body deformation.

In the present invention, when the weight detected by the weight detecting device decreases from a prior detected weight to a subsequent detected weight that differs therefrom by an amount greater than or equal to a prescribed value after the door status has changed from the door closed state to the door open state, the system assumes that a passenger on the seat has exited the vehicle or an object on the seat has been removed and stores the subsequent detected weight (the weight detected after the weight decrease) as the reference weight. Since the difference between the reference weight and the weight detected by the weight detecting device is used to determine if a passenger or object is on the seat, the determination of whether or not there is a passenger or object on the seat can be accomplished accurately.

Moreover, the present invention does not require a special power source for the control means in order to store the empty seat weight because it stores the subsequent detected weight as the reference weight when the ignition switch is in the ON state.

Thus, the present invention can grasp with certainty the timing at which the seat entered the empty state indicated by the reference weight because it determines that a person or object has exited the vehicle when the following occurs: the ignition switch changes from the ON state to the OFF state, then the door status changes from the closed state to the open state, and finally the weight detected by the weight detecting device decreases by an amount greater than or equal to a prescribed value.

Thus, the present invention, the period of time over which power must be supplied to store the reference weight can be limited because the reference weight is stored when the first condition is established within a first prescribed time period after the ignition switch changes from the ON state to the OFF state.

The present invention can store the reference weight (which corresponds to the empty seat state) only when a passenger exits the vehicle immediately after a door opens because it stores the reference weight within a second prescribed time period after the door status changes from the closed state to the open state.

The present invention stores a third detected weight, which is the weight detected by the weight detecting device when the ignition switch detected by the ignition detecting means changes from the OFF state to the ON state, as the reference weight when the third detected weight is negative. Consequently, when the weight detected by the weight detecting device is negative, the system determines that there is no passenger or object on the seat and stores the third detected weight as the reference weight.

The present invention executes statistical processing on a prescribed number of second and/or third detected weights and stores the result as the reference weight corresponding to the empty seat state. Consequently, measurement error of the weight detecting device and error caused by inconclusive operations when passengers enter and exit the vehicle can be suppressed.

The foregoing can basically be attained by a passenger detection system comprising a weight detecting device, a door status detecting device, a storage device and a determining device. The weight detecting device is arranged and configured to detect weight on a seat. The door status detecting device is arranged and configured to detect open/closed door status of a vehicle door. The storage device is arranged and configured to store a reference weight, the reference weight being set to a subsequent detected weight if the subsequent detected weight is lighter than a prior detected weight by an amount greater than or equal to a prescribed value after a first condition has been established indicating that the door status detected by the door status detecting device has changed from a door closed state to a door open state, and a second condition has been established indicating that the weight detected by the weight detecting device has changed from the prior detected weight to the subsequent detected weight. The determining device is arranged and configured to determine if an object is present on the seat based on a difference between current detected by the weight detecting device and the reference weight stored in the storage device.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
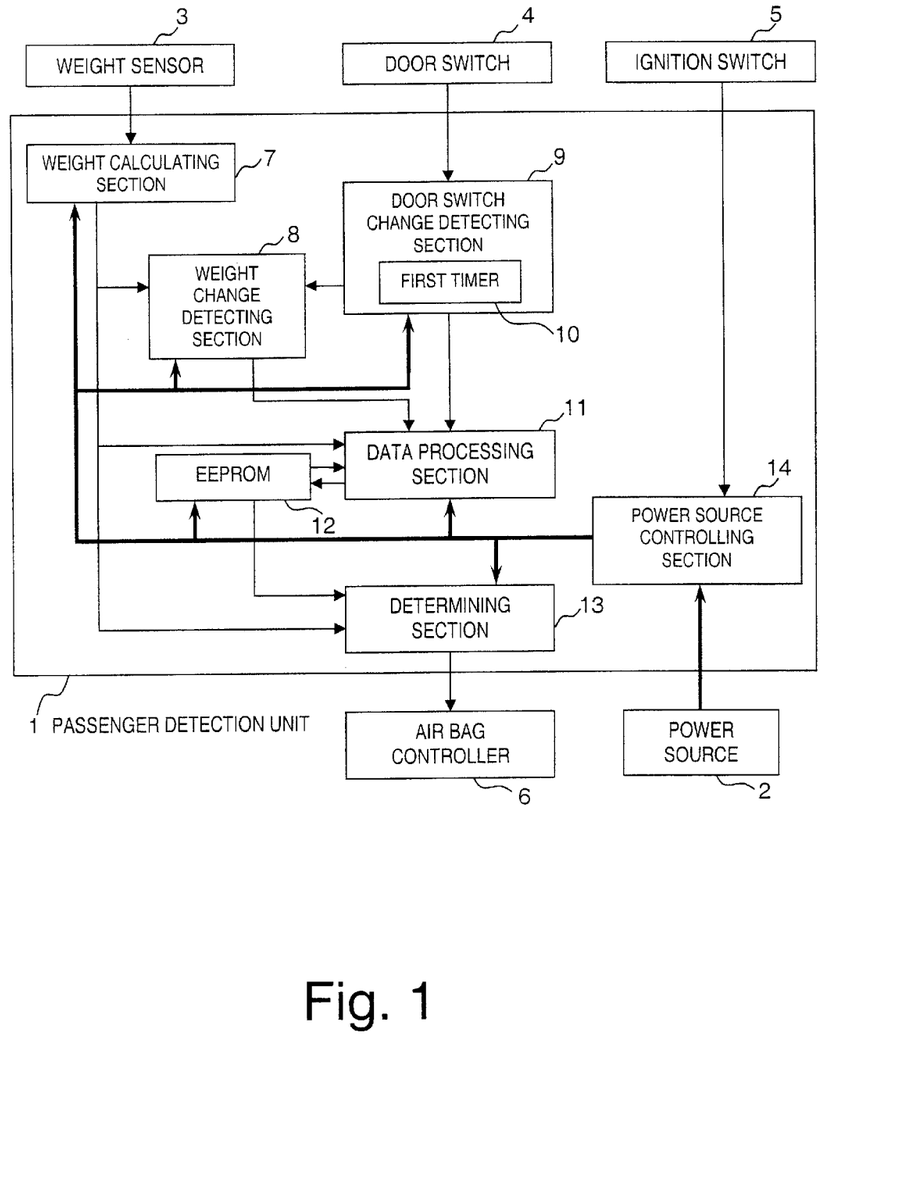
FIG. 1 is a block diagram illustrating a passenger detection unit in accordance with a first embodiment of the present invention.

Referring initially to FIG. 1, a block diagram of a passenger detection unit 1 is illustrated in accordance with a first embodiment of the present invention. As shown in FIG. 1, the passenger detection unit 1 is connected to a power source 2. The passenger detection unit 1 is also connected to a weight sensor 3 that detects the weight on a seat 21, a door switch 4 that detects the door open/closed status, and an ignition switch 5. The passenger detection unit 1 determines if there is a passenger on the seat 21 based on signals from these items and transmits a passenger detection signal to an air bag controller 6. The air bag controller 6 controls an air bag (not shown) based on the passenger detection signal and an acceleration signal from an acceleration sensor (not shown).

Figure 3:
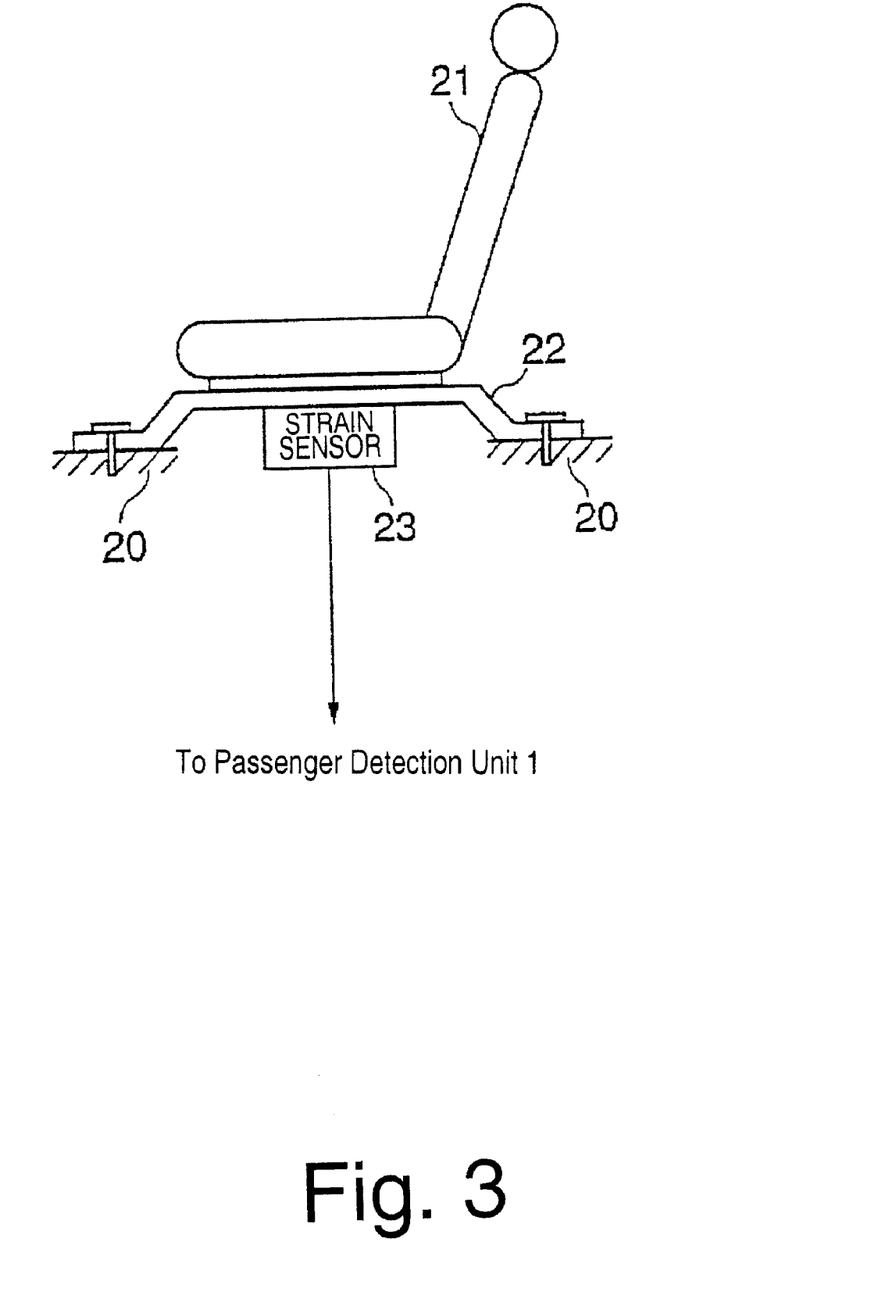
FIG. 3 is a diagrammatic view of a vehicle seat coupled to the vehicle body with a strain sensor operatively coupled to the vehicle seat.

The weight sensor 3 comprises a strain sensor 23 (as shown in FIG. 3) and a circuit section (not shown). The strain sensor 23 is fixed to a portion of a vehicle body 20 and disposed substantially at the center of a seat frame 22, which holds the seat 21. The strain caused by the change in weight applied to the strain sensor 23 is detected as a change in resistance in the circuit section and the resulting detection signal is sent to the passenger detection unit 1. In other words, the weight sensor 3 is arranged and configured to detect the weight on the seat 21 by detecting the deflection of the rigid part 22 that secures the seat 21 to the vehicle body 20.

Now, the main features or parts of the passenger detection unit 1 will be described. Basically, the passenger detection unit 1 includes a weight calculating section 7, a weight change detecting section 8, a door switch change detecting section 9 with an internal first timer 10, a data processing section 11, an EEPROM 12, a determining section 13, and a power source controlling section 14.

The weight calculating section 7 calculates the weight W based on the detection signal (resistance value) from the weight sensor 3 and sends the result to the weight change detecting section 8, the data processing section 11, and the determining section 13.

The door switch change detecting section 9 includes the internal first timer 10. The door switch change detecting section 9 monitors the door open/closed signal from the door switch 4. When the door changes from the closed state to the open state, the first timer 10 begins measuring time and the door switch change detecting section 9 sends the door open/closed signal to the weight change detecting section 8 and the data processing section 11 for a prescribed period of time, e.g., 10 seconds.

If, during the period while the door open/closed signal is being received from the door switch change detecting section 9, the value of the weight W received from the weight calculating section 7 decreases by an amount greater than or equal to a prescribed value, e.g., 30 kg, in comparison with the value of the weight W received at the point in time when the door open/closed signal was first received, the weight change detecting section 8 will send a weight change signal to the data processing section 11.

When it begins receiving power from the power source 2, the data processing section 11 recognizes that the ignition switch 5 has changed from OFF to ON and determines if the value of the weight W received from the weight calculating section 7 is negative. If the value of the weight W is negative, the value of the weight W is stored in the history memory section inside of the EEPROM 12.

In cases where the weight change signal is received from the weight change detecting section 8 during the period while the door open/closed signal is being received from the door switch change detecting section 9, the current value of the weight W sent from the weight calculating section 7 is compared with the value of the weight W (−1) from the immediately preceding cycle. If the difference is within a prescribed range (e.g., ±0.1%), the current value of the weight W is stored in the history memory section inside of the EEPROM 12. When ten weights W have been stored in the history memory section, the average value thereof is calculated and stored as a reference weight S in the reference weight memory section inside of the EEPROM 12.

The EEPROM 12 has a reference weight memory section that stores the reference weight S used for determining if there is a passenger on the seat 21 and a history memory section that stores data for calculating the reference weight S. The history memory section is set such that it can store, for example, ten data items.

The determining section 13 determines if there is a passenger by comparing the weight W from the weight calculating section 7 to the reference weight S stored inside of the EEPROM 12 and sends the passenger detection signal to the air bag controller 6.

Based on the ON/OFF status received from the ignition switch 5, the power source controlling section 14 only supplies power to the various sections when the ignition switch 5 is ON.

Figure 2:
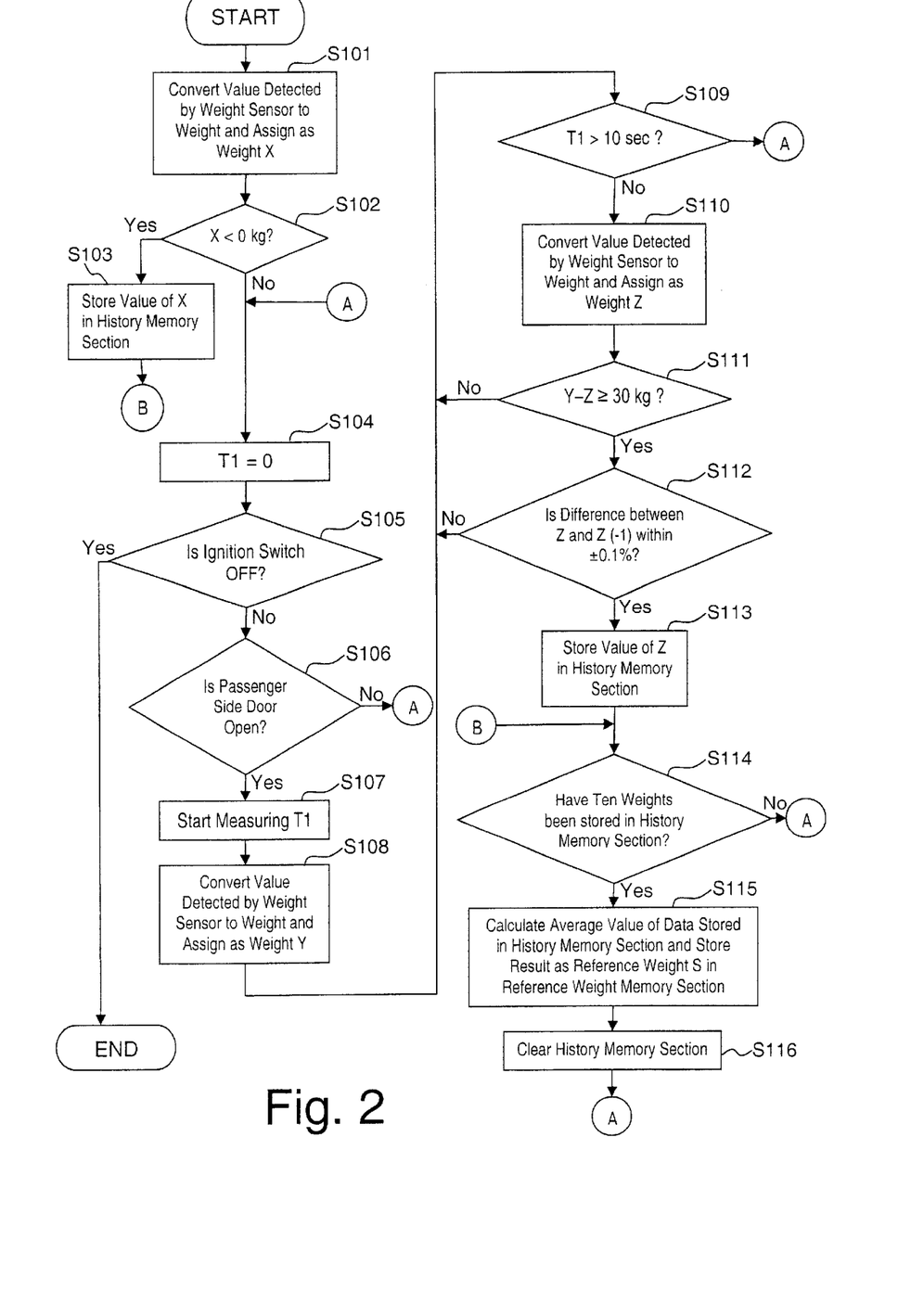
FIG. 2 is a processing flowchart for the passenger detection unit illustrated in FIG. 1 in accordance with the first embodiment of the present invention.

Now, the processing that takes place in the passenger detection unit 1 of this first embodiment of the present invention will be described using the flowchart shown in FIG. 2. Here, the embodiment is described using a passenger detection system installed in the passenger seat as an example.

The flowchart starts when the power source controlling section 14 detects that the ignition switch 5 is ON. In step S101, the passenger detection unit 1 reads the value outputted from the weight calculating section 7 at the time when the ignition switch 5 is turned ON and assigns this value "weight X."

In step S102, the passenger detection unit 1 determines if the weight X is smaller than 0 kg, i.e., negative. If yes, the passenger detection unit 1 stores the weight X in the history memory section of the EEPROM 12 as the empty seat weight (step S103) and then proceeds to step S114. If no, the passenger detection unit 1 proceeds to step S104.

In step S104, the passenger detection unit 1 clears a value T1 of the first timer 10 of the door switch change detecting section 9.

In step S105, the power source controlling section 14 determines if the ignition switch 5 is OFF. If yes, processing of the passenger detection unit 1 ends. If no, the passenger detection unit 1 proceeds to step S106.

In step S106, the door switch change detecting section 9 determines if the passenger side door has changed from the closed state to the open state based on the signal from the door switch 4. If no, the passenger detection unit I returns to step S104. If yes, the passenger detection unit 1 proceeds to step S107.

In step S107, the passenger detection unit 1 starts measuring the elapsed time T1 using the first timer 10.

In step S108, the weight change detection section 8 reads the value outputted from the weight calculating section 7 at the time when the passenger side door was opened and assigns this value "weight Y."

In step S109, the passenger detection unit 1 determines if elapsed time T1 measured by the first timer 10 has reached 10 seconds. If yes, the passenger detection unit 1 returns to step S104. If no, the passenger detection unit 1 proceeds to step S110.

In step S110, the weight change detecting section 8 reads the value outputted from the weight calculating section 7 and assigns this value "weight Z."

In step S111, the weight change detecting section 8 determines if the weight Z is less than the weight Y by an amount of 30 kg or greater. If no, the passenger detection unit 1 returns to step S109. If yes, the passenger detection unit 1 determines that a passenger who was sitting on the passenger seat has exited the vehicle or an object that was on the passenger seat has been removed and proceeds to step S112.

In step S112, the passenger detection unit 1 compares the value of the weight Z with the value of the weight Z (−1) from the immediately preceding cycle and determines if the difference is within a prescribed value, e.g., ±0.1%. If no, the passenger detection unit 1 returns to step S109. If yes, the passenger detection unit 1 proceeds to step S113.

In step S113, the value of weight Z is stored as the empty seat weight in the history memory section inside of the EEPROM 12.

In step S114, the passenger detection unit 1 checks if ten weight values have been stored in the history memory section. If no, the passenger detection unit 1 returns to step S104. If yes, the passenger detection unit 1 goes to step S115 where it finds the average value of the ten weight values and stores the average value as the reference weight S in the reference weight memory section inside of the EEPROM 12. Then, the passenger detection unit I proceeds to step S116.

In step S116, the passenger detection unit 1 clears the history memory section and returns to step S104.

As previously explained, this first embodiment of the present invention recognizes that the ignition switch 5 has changed from OFF to ON when the data processing section 11 begins receiving power; it then determines if the value of the weight detected at that time is negative. If the value is negative, the weight value is stored in the history memory section. Meanwhile, when the ignition switch 5 is ON and the weight decreases by 30 kg or more within 10 seconds after the passenger side door opens, the value after the weight decrease is stored in the history memory section. Thus, the passenger detection unit I finds the average value of the ten empty seat weights that were stored in the history memory section and stores the average value as the reference weight S.

Therefore, even if the value of reference weight S shifts due to such a cause as the vehicle body being deformed by a light collision, the reference weight S can be stored so as to correspond to a state in which no passenger or object is on the seat by appropriately determining when neither a passenger nor an object exists on the seat or when a passenger or object has exited the vehicle. Consequently, after such a shift, passenger detection can be accomplished with certainty. Additionally, the embodiment can be implemented with a simple configuration because it does not need a special power supply for the passenger detection unit in order to execute the processing for storing the empty seat weight and calculating and storing the reference weight S. Furthermore, the embodiment can prevent superfluous repetition of the aforementioned processing when passengers and/or objects enter and exit the vehicle at frequent intervals while the passenger seat door remains open, enabling the empty seat weight to be acquired under a variety of conditions.

SECOND EMBODIMENT

Figure 4:
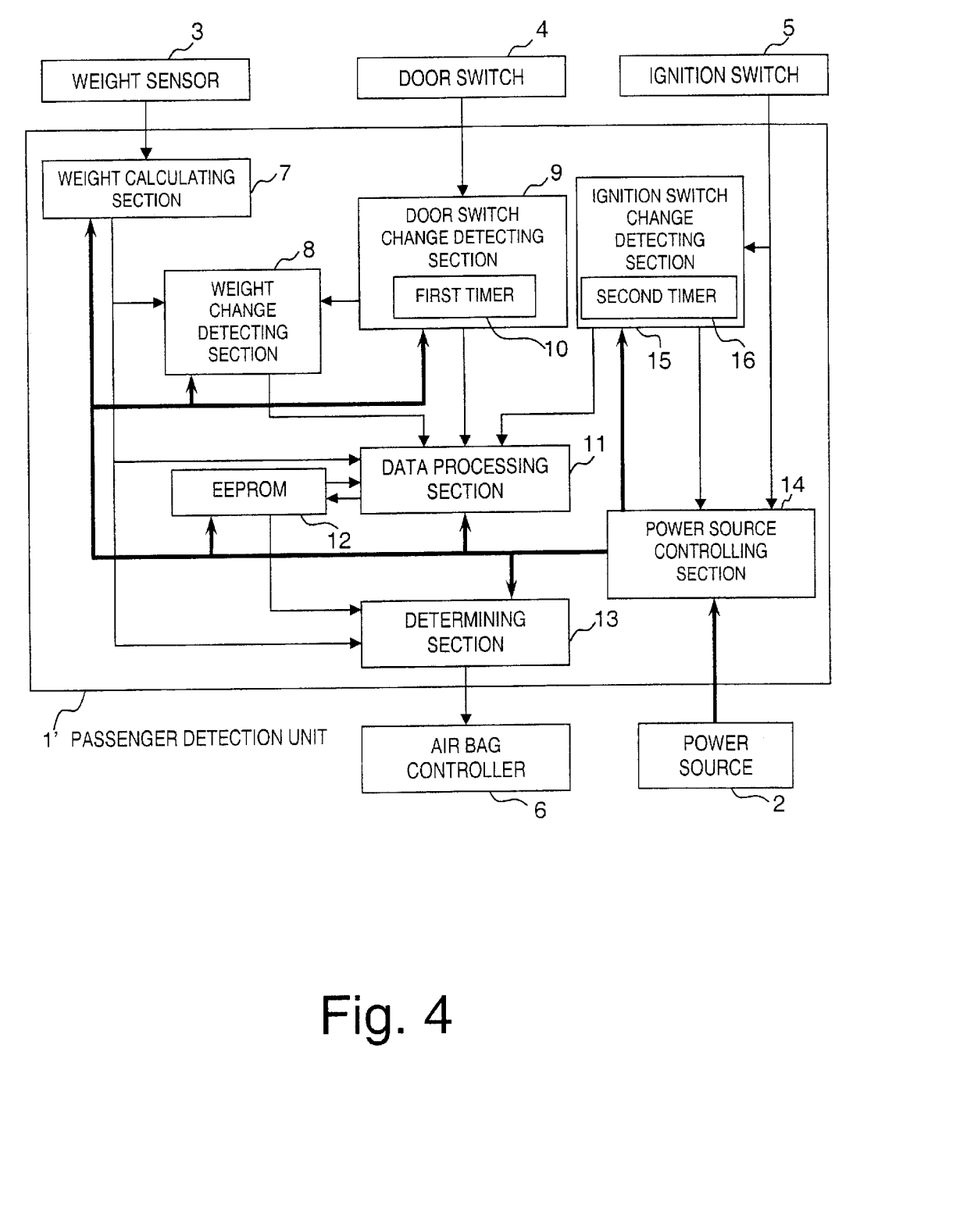
FIG. 4 is a block diagram illustrating a passenger detection unit in accordance with a second embodiment of the present invention.
Figure 5:
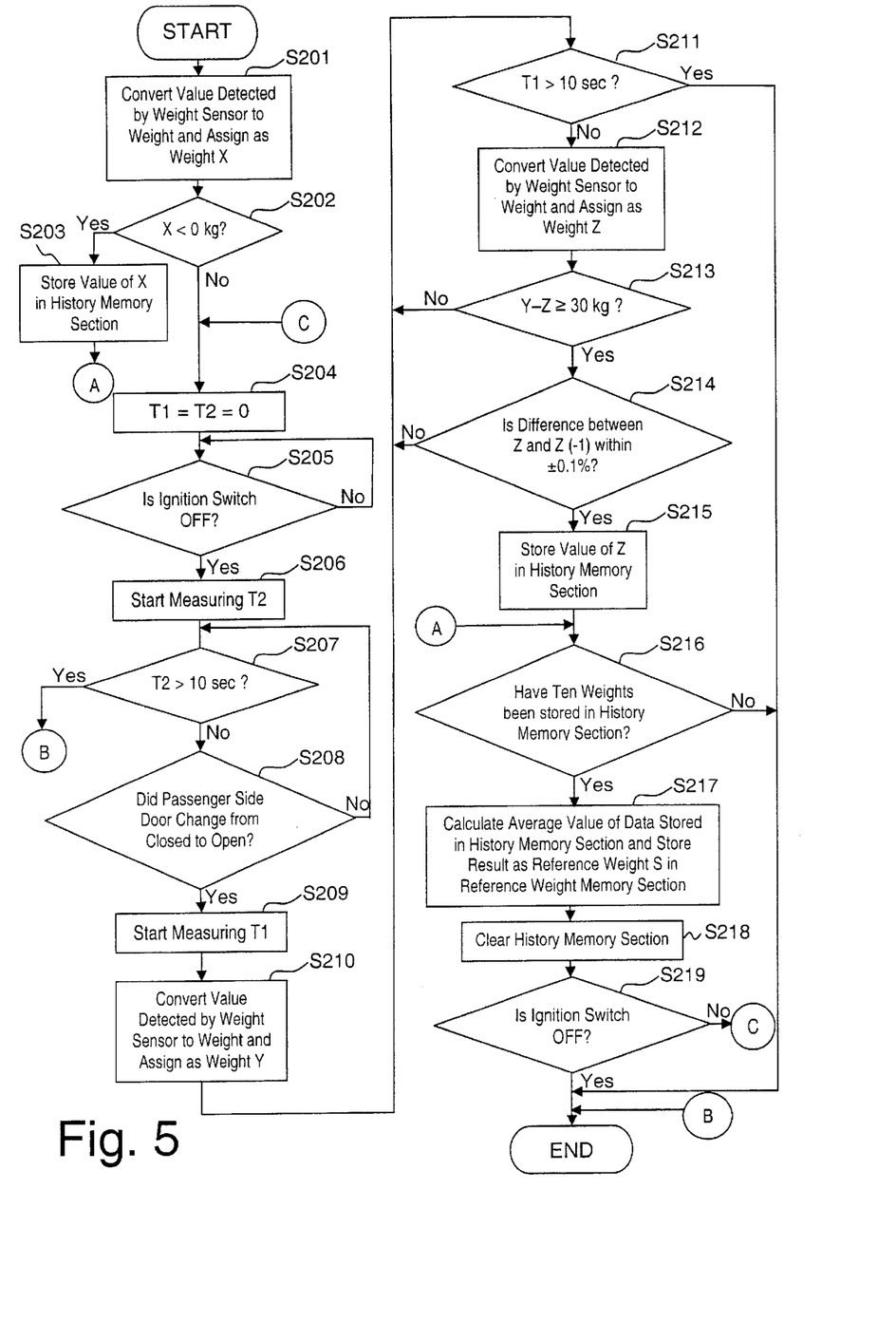
FIG. 5 is a processing flowchart for the passenger detection unit illustrated in FIG. 4 in accordance with the second embodiment of the present invention.

Referring now to FIGS. 4 and 5, a passenger detection unit 1' in accordance with a second embodiment will now be explained. In view of the similarity between the first and second embodiments, the parts or sections of the second embodiment that are identical to the parts or sections of the first embodiment will be given the same reference numerals as the parts of the first embodiment. Moreover, the descriptions of the parts of the second embodiment that are identical to the parts of the first embodiment may be omitted for the sake of brevity.

Referring initially to FIG. 4, a block diagram of the passenger detection unit 1' is illustrated in accordance with this second embodiment of the present invention. As shown in FIG. 4, the passenger detection unit 1' of this second embodiment adds an ignition switch change detecting section 15 to the passenger detection unit 1 of the first embodiment shown in FIG. 1.

The ignition switch change detecting section 15 is equipped with an internal second timer 16 and monitors the ignition signal from the ignition switch 5. When the ignition switch changes from ON to OFF, it starts the second timer 16 and sends an ignition change signal to the data processing section 11 and the power source controlling section 14 for a prescribed period of time, e.g., 10 seconds.

When it begins receiving power from the power source 2, the data processing section 11 recognizes that the ignition switch 5 has changed from OFF to ON and determines if the value of the weight W received from the weight calculating section 7 is negative. If the value is negative, the weight W is stored in the history memory section inside of the EEPROM 12.

Also, the data processing section receives the ignition change signal from the ignition switch change detecting section 15. Then, if the weight change signal is received from the weight change detecting section 8, while the door open/closed signal is being received from the door switch change detecting section 9, the data processing section compares the value of weight W currently sent from the weight calculating section 7 with the value of weight W (−1)

from the immediately preceding cycle and determines if the difference is within a prescribed value, e.g., ±0.1%. If so, the current value of weight W is stored in the history memory section inside of the EEPROM 12. When ten weights W have been stored in the history memory section, the average value thereof is calculated and stored in the history memory section of the EEPROM 12 as the reference weight S.

When the ignition switch signal from the ignition switch 5 changes from OFF to ON, the power source controlling section 14 starts supplying power to the various sections. It continues supplying power to the various sections even when the ignition switch signal changes from ON to OFF so long as the ignition change signal is received from the ignition switch change detecting section 15.

Now, the processing that takes place in the passenger detection unit 1' of this second embodiment of the present invention will be described using the flowchart shown in FIG. 5. Here, the second embodiment is described using a passenger detection system installed in the passenger seat as an example.

The flowchart starts when the power source controlling section 14 detects that the ignition switch 5 is ON. In step S201, the passenger detection unit 1' reads the value outputted from the weight calculating section 7 at the time when the ignition switch 5 is turned ON and assigns this value "weight X."

In step S202, the passenger detection unit 1' determines if the weight X is smaller than 0 kg, i.e., negative. If yes, the passenger detection unit 1' stores the weight X in the history memory section of the EEPROM 12 as the empty seat weight (step S203) and proceeds to step S216. If no, the passenger detection unit 1' proceeds to step S204.

In step S204, the passenger detection unit 1' clears the value T1 of the first timer 10 of the door switch change detecting section 9 and the value T2 of the second timer 16 of the ignition switch change detecting section 15.

In step S205, the ignition switch change detecting section 15 determines if ignition switch 5 has changed from the ON state to the OFF state. If no, the passenger detection unit 1' repeats this step. If yes, the passenger detection unit 1' proceeds to step S206.

In step S206, the passenger detection unit 1' starts measuring the elapsed time T2 using the second timer 16.

In step S207, the passenger detection unit 1' determines if elapsed time T2 measured by the second timer 16 has reached 10 seconds. If yes, the passenger detection unit 1' shuts off the power supplied from the power source 2 and ends the processing. If no, the passenger detection unit 1' proceeds to step S208.

In step S208, the door switch change detecting section 9 determines if the passenger side door has changed from the closed state to the open state based on the signal from the door switch 4. If no, the passenger detection unit 1' returns to step S207. If yes, the passenger detection unit 1' proceeds to step S209.

In step S209, the passenger detection unit 1' starts measuring the elapsed time T1 using the first timer 10.

In step S210, the weight change detection section 8 reads the value outputted from the weight calculating section 7 at the time when the passenger side door was opened and assigns this value "weight Y."

In step S211, the passenger detection unit 1' determines if elapsed time T1 measured by the first timer 10 has reached 10 seconds. If yes, the passenger detection unit 1' shuts off the power supplied from the power source 2 and ends the processing. If no, the passenger detection unit 1' proceeds to step S212.

In step S212, the weight change detecting section 8 reads the value outputted from the weight calculating section 7 and assigns this value "weight Z."

In step S213, the weight change detecting section 8 determines if the weight Z is less than the weight Y by an amount of 30 kg or greater. If no, the passenger detection unit 1' returns to step S211. If yes, the passenger detection unit 1' determines that a passenger who was sitting on the passenger seat has exited the vehicle or an object that was on the passenger seat has been removed and proceeds to step S214.

In step S214, the passenger detection unit 1' compares the value of the weight Z with the value of the weight Z (−1) from the immediately preceding cycle and determines if the difference is within ±0.1%. If no, the passenger detection unit 1' returns to step S211. If yes, the passenger detection unit 1' proceeds to step S215.

In step S215, the value of weight Z is stored as the empty seat weight in the history memory section inside oft the EEPROM 12.

In step S216, the passenger detection unit 1' checks if ten weight values have been stored in the history memory section. If no, the passenger detection unit 1' shuts off the power supplied from the power source 2 and ends the processing. If yes, the passenger detection unit 1' goes to step S217 where it finds the average value of the ten weight values and stores the average value as the reference weight S in the reference weight memory section inside of the EEPROM 12. Then, the passenger detection unit 1' proceeds to step S218.

In step S218, the passenger detection unit 1' clears the history memory section.

In step S219, the passenger detection unit 1' determines if the ignition switch 5 is OFF. If yes, the passenger detection unit 1' shuts off the power supply from the power source 2 and ends the processing. If no, the passenger detection unit 1' returns to step S204. When this step is reached via step S203, the ignition switch 5 is still ON, and thus, it is necessary to continue the processing of this portion of the flowchart.

As previously explained, this second embodiment of the present invention recognizes that the ignition switch 5 has changed from OFF to ON when the data processing section 11 begins receiving power; the passenger detection unit 1' then determines if the value of the weight detected at that time is negative. If the value is negative, the weight value is stored in the history memory section. Meanwhile, when the ignition switch 5 changes from ON to OFF, the passenger side door changes from the closed state to the open state within 10 seconds thereafter, and, then, the weight decreases by 30 kg or more within 10 seconds after the door opens, the value after the weight decrease is stored in the history memory section. Thus, the passenger detection unit 1' finds the average value of the ten empty seat weights that were stored in the history memory section and stores the average value as the reference weight S. Therefore, even if the value of the empty seat reference weight shifts due to such a cause as the vehicle body being deformed by a light collision, the reference weight S can be stored so as to correspond to a state in which no passenger or object exits on the seat, by appropriately determining the empty seat state when the ignition switch 5 changes from OFF to ON and appropriately determining if a passenger or object has exited the vehicle when the ignition switch 5 changes from ON to OFF. Consequently, after such a shift, passenger detection can be accomplished with certainty. Additionally, this embodiment can reduce the power consumption of the power source by limiting the time period during which a special power source is supplied to the passenger detection unit 1' in order to execute the processing for storing the empty seat weight and calculating and storing the reference weight S. Furthermore, this embodiment can prevent superfluous repetition of the aforementioned processing when passengers and/or objects enter and exit the vehicle at frequent intervals while the passenger seat door remains open, enabling the empty seat weight to be acquired under a variety of conditions.

It will be apparent to those skilled in the art from this disclosure that the precise structure and algorithms for the passenger detection unit 1 and 1' can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The term "configured" as used herein to describe a component, section or part of a device includes hardware and/or software that is constructed and/or programmed to carry out the desired function. As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2001-145721. The entire disclosure of Japanese Patent Application No. 2001-145721 is hereby incorporated herein by reference.

Although the previously described embodiments were passenger detection systems for a passenger seat, the present invention is not limited to passenger seat applications. It can also be applied to the driver seat or the rear seat. The present invention can also be used to control, for example, the airflow rate and temperature of an air conditioning apparatus based on the existence or absence of a passenger. Also, although the embodiments demonstrated calculation of an average value as the statistical processing, the invention is not limited to such a calculation and any statistical processing that serves to absorb the measurement error of the empty seat value can be implemented.

In other words, while only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A passenger detection system comprising:
    a weight detecting device arranged and configured to detect weight on a seat;
    a door status detecting device arranged and configured to detect open/closed door status of a vehicle door;
    a storage device arranged and configured to store a reference weight, said reference weight being set to a subsequent detected weight if said subsequent detected weight is lighter than a prior detected weight by an amount greater than or equal to a prescribed value after a first condition has been established indicating that the door status detected by said door status detecting device has changed from a door closed state to a door open state, and a second condition has been established indicating that the weight detected by said weight detecting device has changed from said prior detected weight to said subsequent detected weight; and
    a determining device arranged and configured to determine if an object is present on the seat based on a difference between current detected weight by said weight detecting device and said reference weight stored in said storage device.

2. The passenger detection system as recited in claim 1, further comprising
    an ignition detecting device arranged and configured to detect an ON/OFF status of an ignition switch of the vehicle, and
    said storage device stores said subsequent detected weight as said reference weight when said ignition detecting device detects the ignition switch is in an ON state, said first condition has been established and afterwards said second condition has been established.

3. The passenger detection system as recited in claim 1, further comprising
    an ignition detecting device arranged and configured to detect an ON/OFF status of an ignition switch of the vehicle, and
    said storage device stores said subsequent detected weight as said reference weight when a third condition is established indicating that the ignition switch detected by said ignition detecting device changed from an ON state to an OFF state, said first condition has been established and afterwards said second condition has been established.

4. The passenger detection system as recited in claim 3, wherein
    said storage device stores said subsequent detected weight as said reference weight when said first condition has been established within a first prescribed time period after said third condition has been established and after said second condition has been established.

5. The passenger detection system as recited in claim 4, wherein
    said storage device stores said subsequent detected weight as said reference weight only when said second condition has been established within a second prescribed time period after said first condition has been established.

6. The passenger detection system as recited in claim 5, wherein
    said storage device includes a history storage section to store a prescribed number of said subsequent detected weights, a computing section to execute statistical processing with respect to a plurality of said subsequent detected weights stored in said history storage section, and said storage device stores said reference weight based on the statistical processing executed by said computing section.

7. The passenger detection system as recited in claim 1, wherein said storage device stores said subsequent detected weight as said reference weight only when said second condition has been established within a prescribed time period after said first condition has been established.

8. The passenger detection system as recited in claim 1, wherein said storage device includes a history storage section to store a prescribed number of said subsequent detected weights, a computing section to execute statistical processing with respect to a plurality of said subsequent detected weights stored in said history storage section, and said storage device stores said reference weight based on the statistical processing executed by said computing section.

9. A passenger detection system comprising:

a weight detecting device arranged and configured to detect weight on a seat;

an ignition detecting device arranged and configured to detect an ON/OFF status of an ignition switch of the vehicle;

a storage device arranged and configured to store a reference weight, said reference weight being set to a detected weight detected by said weight detecting device when the ignition switch detected by said ignition detecting device changes from an OFF state to an ON state and said detected weight is negative relative to a prior value of said reference weight; and a determining device arranged and configured to determine if an object is present on the seat based on a difference between a current weight detected by said weight detecting device and said reference weight stored in said storage device.

10. The passenger detection system as recited in claim 9, wherein said storage device includes a history storage section to store a prescribed number of said detected weights, a computing section to execute statistical processing with respect to a plurality of said detected weights stored in said history storage section, and said storage device stores said reference weight based on the statistical processing executed by said computing section.

11. A passenger detection system comprising:

weight detecting means for detecting weight on a seat;

door status detecting means for detecting open/closed door status of a vehicle door;

memory means for storing a reference weight, said reference weight being set to a subsequent detected weight if said subsequent detected weight is lighter than a prior detected weight by an amount greater than or equal to a prescribed value after a first condition has been established indicating that the door status detected by said door status detecting means has changed from a door closed state to a door open state, and a second condition has been established indicating that the weight detected by said weight detecting means has changed from said prior detected weight to said subsequent detected weight; and determining means for determining if an object is present on the seat based on a difference between current detected by said weight detecting means and said reference weight stored in said memory means.

* * * * *